Figure 4:
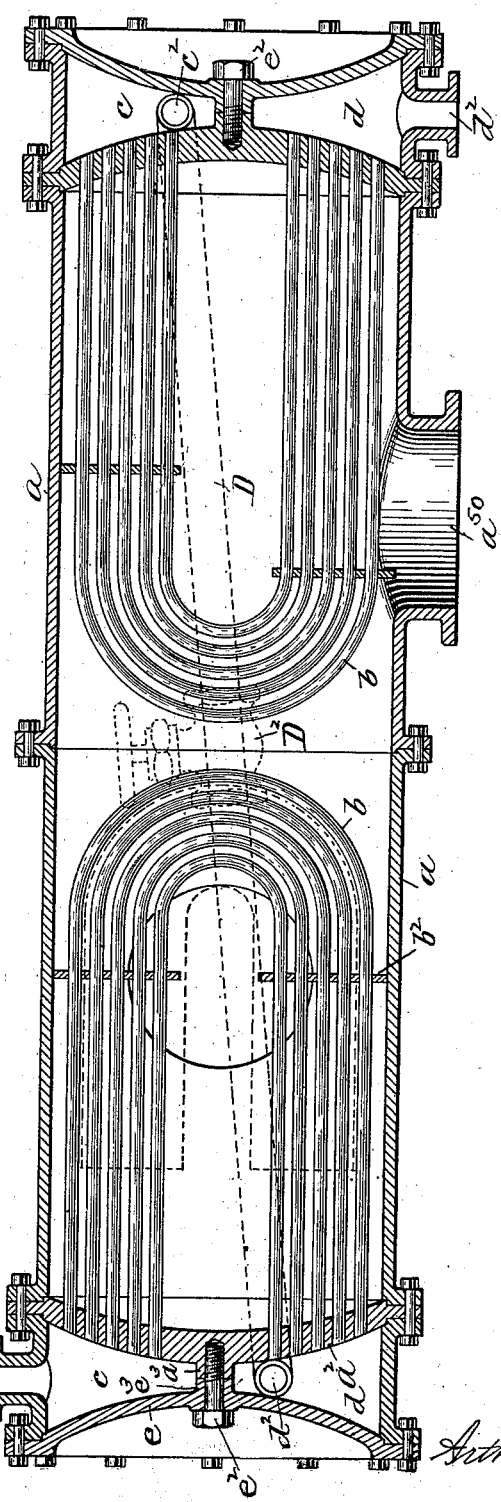

No. 686,313. Patented Nov. 12, 1901.
A. S. MANN.
FEED WATER HEATER.
(Application filed Apr. 16, 1900.)
(No Model.) 2 Sheets—Sheet 1.
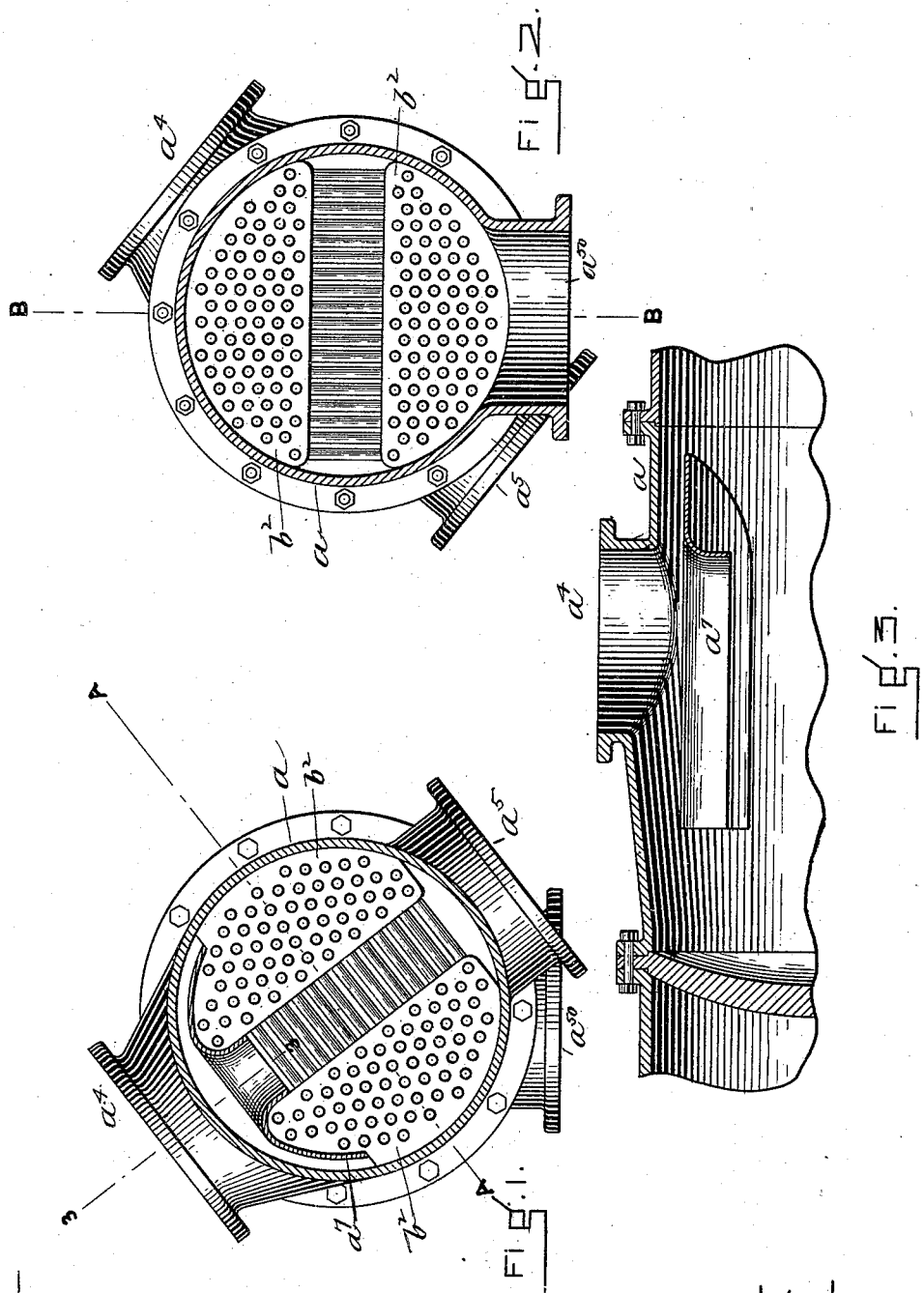

No. 686,313. Patented Nov. 12, 1901.
A. S. MANN.
FEED WATER HEATER.
(Application filed Apr. 16, 1900.)

(No Model.) 2 Sheets—Sheet 2.

WITNESSES:
E. D. Mann
Levi R. Greene

INVENTOR:
Arthur S. Mann

UNITED STATES PATENT OFFICE.

ARTHUR S. MANN, OF NEW YORK, N. Y., ASSIGNOR TO WALWORTH MANUFACTURING COMPANY, OF BOSTON, MASSACHUSETTS, A CORPORATION OF MASSACHUSETTS.

FEED-WATER HEATER.

SPECIFICATION forming part of Letters Patent No. 686,313, dated November 12, 1901.

Application filed April 16, 1900. Serial No. 13,114. (No model.)

*To all whom it may concern:*

Be it known that I, ARTHUR S. MANN, of New York, county of New York, and State of New York, have invented an Improvement in Feed-Water Heaters, of which the following description, in connection with the accompanying drawings, is a specification, like letters on the drawings representing like parts.

The present invention relates to a feed-water heater, and is embodied in a heater of novel construction and arrangement, the object being to increase the heating-surface and the consequent heating capacity and at the same time to obtain a heater in which the joints and connections will be comparatively unaffected by expansion and contraction.

The heater embodying the invention comprises a shell containing bent or U-shaped tubes and being provided at the end with two water-chambers, one of which has an inlet and the other an outlet, one of the said chambers communicating with one end of each tube and the other chamber communicating with the other end of each tube, so that the water entering one chamber passes through the tubes from one chamber to the other, being subjected to the heat of the steam within the shell. It is practicable with this construction to connect two of the shells together endwise, with the bent portions of the tubes projecting inward toward each other, and to connect the water-outlet chamber at one end of the heater with the water-inlet chamber at the opposite end of the heater, so as to double the capacity of the heater, the two shells being in communication, so that the entire heating-space is filled with exhaust-steam. The outlets at one end and the inlets at the other end, however, are not necessarily connected together in "series," so to speak, since it is obvious that the same heating capacity is afforded if the water is passed into each end of the heater by means of branch pipes, or, in other words, in multiple.

A further feature of the invention consists in providing the heater with an expansion-chamber to receive the exhaust-steam before it reaches the tubes, so that the said steam instead of blowing directly against the tubes will expand to greater advantage throughout the entire shell and cause the heat to be evenly distributed over the entire heating-surface. The most convenient way of providing the apparatus with such expansion-chamber is by inclining the walls thereof away from the inlet-opening, which is preferably at the side of the shell, the tubes in front of the inlet-opening being protected from the direct impact of the steam by means of a baffle-plate, the enlarged space between the actual steam-inlet opening and the baffle-plate thus constituting the necessary expansion-chamber and causing the steam to expand evenly throughout the shell.

Figure 1 is a transverse section of a heater embodying the invention, the section being taken on a plane adjacent to the steam-inlet. Fig. 2 is a similar transverse section taken through the steam-outlet; Fig. 3, a longitudinal section of a portion of the shell and baffle-plate, the water-tubes not being shown; and Fig. 4 is a complete longitudinal section of a double heater provided with a cross connection, the relative positions of the steam inlet and outlet and that of the tubes being somewhat different from the arrangement shown in the other views in order to more clearly illustrate the construction.

Referring to Fig. 4, the heater comprises a shell $a$, preferably cylindrical in shape, provided with a head $a^2$, containing the water-tubes $b$, which, as shown, are curved or U-shaped, so that each end of each tube is connected with the head $a^2$ and opens through the same. The said tubes are commonly expanded into the said head in the usual way. The shell $a$ is provided beyond the head $a^2$ with water inlet and outlet chambers $c$ and $d$, which are separated from each other, as shown, and provided, respectively, with inlet and outlet ducts $c^2$ and $d^2$. The said chambers are shown as formed by clamping to the shell-head a smaller annular shell, which is closed by means of a supplemental head $e$, bolted to a flange upon the said shell, and also preferably connected, as by a bolt $e^2$, with the head $a^2$, each of the said heads having a projecting rib $e^3$ and $a^3$, respectively, which come in contact with each other to form the dividing-wall between the inlet-chamber c and the outlet-chamber d. The tubes are shown as supported within the shell by means of plates $b^2$, (see Figs. 1 and 2,) the said plates having openings to receive the tubes and being so shaped as to fit within the shell to thereby hold the inner portion of the tubes in position. As shown in Figs. 1 and 2, the two ends of the heater are preferably coupled together in such relative positions that the bent portions of the tubes will be at an angle to each other, since this affords a better distribution of the heating-surface and causes the same to be subjected to the action of the steam to better advantage. For convenience in illustration, however, the two ends of the heater are shown in Fig. 4 as coupled together with the bent ends of the tubes substantially parallel, since the arrangement of the main steam-inlet and the steam-outlet is more conveniently illustrated in this way, while it is immaterial so far as relates to the invention what the actual position of the tubes and steam inlet and outlet may be. In order to make this fully clear, it may be stated that the left-hand portion of Fig. 4 is a true section on the line A A of Fig. 1, while the right-hand side of the said Fig. 4 is a true section on the line B B of Fig. 2.

The shell $a$ is provided with a steam-inlet $a^4$ and steam-outlet $a^5$, and in order to provide an expansion-chamber for the steam the walls of the shell are inclined away from the actual inlet, as best shown in Figs. 1, 2, and 3, so that the steam can expand before coming in contact with the water-tubes instead of impinging directly against the tubes as it passes into the shell.

To aid in the protection of the tubes from the direct impact of the steam and in the distribution of the steam over the heating-surface, the heater is provided with a baffle-plate $a^7$, situated in the path of the incoming steam and so shaped as to overlie and protect the tubes, at the same time deflecting the steam between and around the tubes, so that the heating effect will be completely and evenly distributed over the entire heating-surface.

In order to practically double the capacity of the heater, two of the shells $a$ may be employed and clamped together, as best shown in Fig. 4, the shells being substantially the same in construction and each provided at one end with the inlet and outlet chambers for the water. In this case the outlet $d^2$ from the chamber $d$ at one end is connected, as by a pipe D, (shown in dotted lines, Fig. 4,) with the inlet-chamber $c$ at the opposite end, the said pipe D communicating with the inlet $c^2$, while the outlet $d^2$ from the chamber $d$ at that end leads to the boiler. In this case the water entering at the first inlet $c^2$ will pass through the tubes $b$ at one end of the heater into the chamber $d$ at the same end, and thence to the chamber $c$ at the opposite end and through the tubes to the chamber $d$, the entire shell being filled with the exhaust-steam. It is immaterial, however, whether the tube D is utilized or not, since the apparatus may obviously be so piped as to cause the water to be divided before reaching the heater, part entering the inlet-chamber at one end and part entering the inlet-chamber at the other end. As will be seen from the drawings, the parts are so constructed that the additional or supplemental shell may be clamped to the main shell without changing any of the parts, each shell being provided at each end with flanges which are adapted to receive either one of the heads $a^2$ or the flange of a supplemental shell. As a matter of construction the main shell is shown as provided with the sole steam-inlet and also with the steam-outlet $a^5$ opposite thereto, the baffle-plate of course being also contained in said main shell. The supplemental shell is provided with a steam-outlet $a^{50}$ and has no steam-inlet of its own, the steam passing from the main inlet through the shell and out through the outlet $a^{50}$, the outlet $a^5$ being in this case cut off. This construction renders it unnecessary to make so many different sizes of heaters, and if a double-ended heater is installed it is obvious that should the tubes at either end leak or become defective the other end may still be used by changing the connections, so that it is not necessary to immediately shut down for repairs. The tube D is shown as provided with a valve $D^2$, which can be shut off in case only one end of the heater is to be used, and the water can be taken from the chamber $d$ by any suitable pipe connection. Furthermore, the supplemental shell can be readily removed and a closed head clamped on in its place, if desired. The double-shell construction, however, is not essential, since a single shell provided with the necessary steam inlet and outlet might be provided at each end with the inlet and outlet chambers for the water, the tube system being the same as shown and described.

It is not intended to limit the invention to the specific construction and arrangement shown and described, since modifications may be made without departing from the invention.

I claim—

1. A feed-water heater comprising a shell to contain steam, a water-inlet chamber at each end of said shell and a water-outlet chamber; a series of bent or U-shaped tubes at each end of the shell projecting toward each other, the said tubes constituting closed water-passages leading into and out of the shell from the water-inlet chamber to the water-outlet chamber at the same end of the shell; and means for distributing the steam throughout the shell, as set forth.

2. A feed-water heater comprising a shell having at each end a water-inlet chamber and a water-outlet chamber, the outlet-chamber at one end being connected by means of a tube or duct to the inlet-chamber at the opposite end; a series of bent or U-shaped tubes at each end to afford a passage for the water from the inlet-chamber to the outlet-chamber at the end where the tubes are located; a steam-inlet passage for the shell; and a plurality of steam-outlet passages for the same, as set forth.

3. A feed-water heater comprising a shell having a steam-inlet and a steam-outlet; a series of bent or U-shaped tubes projecting into the said shell at each end to afford passages for the water to be heated; a baffle-plate between the said tubes and the steam-inlet to take the direct impact of the steam; and an expansion-chamber to permit expansion of the steam before it comes in contact with the tubes, as set forth.

In testimony whereof I have signed my name to this specification in the presence of two subscribing witnesses.

ARTHUR S. MANN.

Witnesses:
   TESSIE DAVIS,
   CHAS. FAUST.